(12) United States Patent
Molesini et al.

(10) Patent No.: US 12,258,878 B2
(45) Date of Patent: Mar. 25, 2025

(54) LUBRICANT SYSTEM

(71) Applicant: GE Avio S.r.l., Rivalta di Torino (IT)

(72) Inventors: Pietro Molesini, Castelnuovo del Garda (IT); Alberto Frezet, Turin (IT); Saypen Baraggia Au Yeung, Valenza (IT)

(73) Assignee: GE AVIO S.R.L., Rivalta di Torino (IT)

( * ) Notice: Subject to any disclaimer, the term of this patent is extended or adjusted under 35 U.S.C. 154(b) by 66 days.

(21) Appl. No.: 18/320,564

(22) Filed: May 19, 2023

(65) Prior Publication Data
US 2023/0313707 A1 Oct. 5, 2023

Related U.S. Application Data

(63) Continuation of application No. 16/895,336, filed on Jun. 8, 2020, now Pat. No. 11,686,219.

(30) Foreign Application Priority Data

Jul. 10, 2019 (IT) .................. 102019000011391

(51) Int. Cl.
| | | |
|---|---|---|
| *F01D 25/20* | (2006.01) | |
| *F01D 25/12* | (2006.01) | |
| *F01M 5/00* | (2006.01) | |
| *F01M 11/00* | (2006.01) | |
| *F02C 7/06* | (2006.01) | |
| *F16H 57/04* | (2010.01) | |
| *F01M 1/02* | (2006.01) | |

(52) U.S. Cl.
CPC ............ *F01D 25/20* (2013.01); *F01D 25/12* (2013.01); *F01M 5/007* (2013.01); *F01M 11/00* (2013.01); *F02C 7/06* (2013.01); *F16H 57/0412* (2013.01); *F16H 57/0482* (2013.01); *F01M 1/02* (2013.01); *F01M 2250/60* (2013.01)

(58) Field of Classification Search
CPC .......... F01D 25/18; F01D 25/20; F01D 25/12; F01M 5/007; F01M 11/00; F01M 1/02; F01M 2250/60; F02C 7/06; F16H 57/0412; F16H 57/0413; F16H 57/0482; F16H 57/0434; F16H 57/0435; F16H 57/0479; F16H 57/08; F05D 2260/606; F16N 7/00; F16N 2210/02; F16N 2250/08; F16N 2270/70; F16N 2280/00
See application file for complete search history.

(56) References Cited

U.S. PATENT DOCUMENTS

| | | |
|---|---|---|
| 3,404,837 A | 10/1968 | James |
| 4,041,697 A | 8/1977 | Coffinberry et al. |

(Continued)

FOREIGN PATENT DOCUMENTS

| | | |
|---|---|---|
| CN | 106168166 A | 11/2016 |
| EP | 1389671 A2 | 2/2004 |

*Primary Examiner* — Loren C Edwards
(74) *Attorney, Agent, or Firm* — Venable LLP; Peter T. Hrubiec; Michele V. Frank

(57) ABSTRACT

A lubricant system for supplying lubrication to a component in a turbine engine includes a lubricant reservoir, a supply line fluidly coupling the lubricant reservoir to the component in the turbine engine, a scavenge line fluidly coupling the component to the lubricant reservoir, and a bypass line fluidly coupling the supply line to the scavenge line and bypassing the component.

19 Claims, 7 Drawing Sheets

(56) References Cited

U.S. PATENT DOCUMENTS

| | | | |
|---|---|---|---|
| 4,569,196 A * | 2/1986 | Waddington | F16N 29/02 |
| | | | 60/39.08 |
| 7,997,062 B2 | 8/2011 | Sun et al. | |
| 9,097,169 B2 | 8/2015 | Logan et al. | |
| 9,669,346 B2 | 6/2017 | Borkowski | |
| 9,879,563 B2 | 1/2018 | Phillips et al. | |
| 10,138,814 B2 | 11/2018 | Logan et al. | |
| 11,686,219 B2 * | 6/2023 | Molesini | F01M 5/007 |
| | | | 60/39.08 |
| 2006/0081419 A1 * | 4/2006 | Care | F16N 7/40 |
| | | | 184/6.11 |
| 2009/0078508 A1 | 3/2009 | DeLaloye | |
| 2009/0151314 A1 | 6/2009 | Tumelty et al. | |
| 2013/0343888 A1 | 12/2013 | Nielsen et al. | |
| 2014/0090355 A1 | 4/2014 | James et al. | |
| 2014/0223917 A1 | 8/2014 | Gameiro et al. | |
| 2014/0231062 A1 * | 8/2014 | Adique | F02C 7/14 |
| | | | 165/287 |
| 2015/0044036 A1 | 2/2015 | Fitzpatrick et al. | |
| 2015/0114337 A1 * | 4/2015 | Marthaler | F01M 5/025 |
| | | | 137/12 |
| 2016/0003148 A1 | 1/2016 | Gameiro et al. | |
| 2017/0198605 A1 | 7/2017 | Vielcanet et al. | |
| 2018/0031111 A1 | 2/2018 | Mehravaran | |
| 2018/0066552 A1 | 3/2018 | Waddleton et al. | |
| 2018/0156117 A1 | 6/2018 | Teicholz et al. | |
| 2018/0274564 A1 | 9/2018 | Digesù et al. | |
| 2018/0371969 A1 | 12/2018 | McCormick | |

* cited by examiner

LUBRICANT SYSTEM

CROSS-REFERENCE TO RELATED APPLICATIONS

This application is a continuation of U.S. patent application Ser. No. 16/895,336 filed on Jun. 8, 2020, which claims priority to Italian Application No. 102019000011391, filed Jul. 10, 2019, the entire contents of each of which are hereby incorporated by reference in their entireties.

The project leading to this application has received funding from the Clean Sky 2 Joint Undertaking under the European Union's Horizon 2020 research and innovation program under grant agreement No. CS2-LPA-GAM-2018/2019-01.

TECHNICAL FIELD

The disclosure generally relates to a lubricant system for an engine, and more specifically to a lubricant system and method of lubricating a lubricated component in a turbine engine.

BACKGROUND

Turbine engines, and particularly gas or combustion turbine engines, are rotary engines that extract energy from a flow of combusted gases passing through the engine onto a multitude of rotating turbine blades.

Turbine engines can utilize a lubricant system for temperature control and lubrication of the engine, and various components thereof, during operation. The lubricant can also be utilized for heat exchange with the fuel supplying the engine. The lubricant can further be used for actuation of various control systems, including control surfaces.

BRIEF DESCRIPTION

In one aspect, the disclosure relates to a lubricant system for a turbine engine having at least one lubricated component. The lubricant system includes a lubricant reservoir, a supply line fluidly coupling the lubricant reservoir to the lubricated component, a scavenge line fluidly coupling the lubricate component to the lubricant reservoir, a bypass line fluidly coupling the supply line to the scavenge line and bypassing the lubricated component, a controllable bypass valve fluidly coupled to and controlling the flow of lubricant through the bypass line, a first sensor providing a first output indicative of a first lubricant parameter in the supply line, a second sensor providing a second output indicative of a second lubricant parameter in the scavenge line, and a controller receiving the first and second outputs and operably controlling the bypass valve based on the first and second outputs.

In another aspect, the disclosure relates to a turbine engine including a compressor, combustor, and turbine in axial flow arrangement, a shaft operably coupled to at least one of the compressor, combustor, or turbine, a lubricated component operably coupled to at least one of the compressor, combustor, turbine, or shaft, and a lubricant system fluidly coupled to the component. The lubricant system includes a lubricant reservoir, a supply line fluidly coupling the lubricant reservoir to the lubricated component, a scavenge line fluidly coupling the lubricate component to the lubricant reservoir, a bypass line fluidly coupling the supply line to the scavenge line and bypassing the lubricated component, a controllable bypass valve fluidly coupled to and controlling the flow of lubricant through the bypass line, a first temperature sensor providing a first output indicative of a parameter of the lubricant in the supply line, a second temperature sensor providing a second output indicative of a parameter of the lubricant in the scavenge line, and a controller receiving the first and second outputs and operable controlling the bypass valve based on the first and second outputs.

In yet another aspect, the disclosure relates to a method of supplying lubricant to a lubricated component within a turbine engine. The method includes recirculating lubricant through a recirculation line from a reservoir, through the lubricated component, and back to the reservoir, sensing a first parameter of the lubricant upstream of the lubricated component, sensing a second parameter of the lubricant downstream of the lubricated component, and bypassing around the lubricated component at least some of the lubricant in the recirculation line based on the sensed first and second parameters.

DETAILED DESCRIPTION OF THE INVENTION

Figure 1:
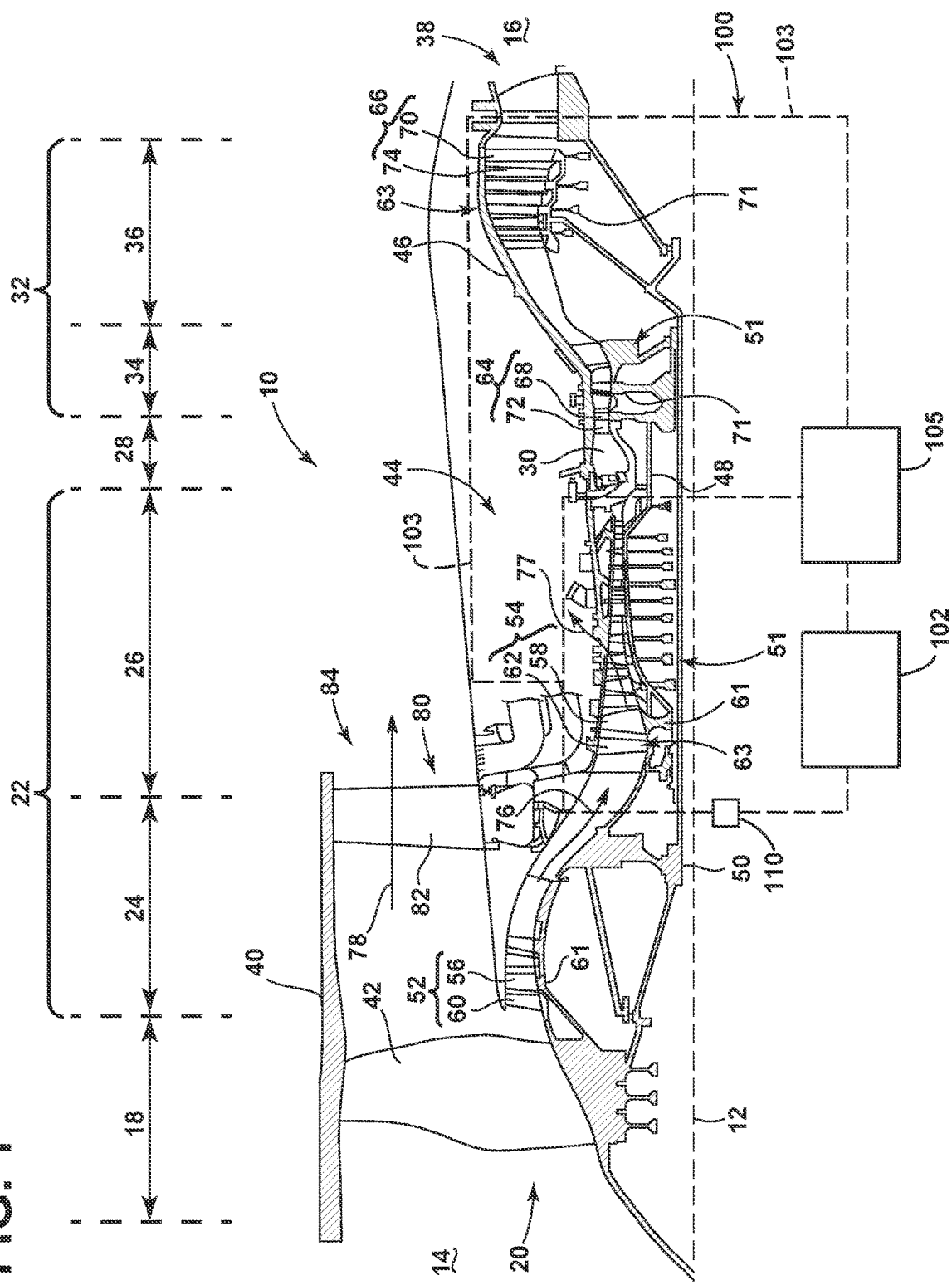
FIG. 1 is a schematic cross-sectional diagram of a gas turbine engine for an aircraft having an exemplary lubricant system in accordance with various aspects described herein.

Aspects of the disclosure described herein are broadly directed to a method and apparatus for sensing and controlling aspects of lubricant to a component. For the purposes of illustration, one exemplary environment within which the lubricant system can be utilized will be described in the form of a turbine engine. Such a turbine engine can be in the form of a gas turbine engine, a turboprop, turboshaft or a turbofan engine having a power gearbox, in non-limiting examples. For example, lubricant measurements can be performed within the engine in real time, as well as between operations and while the engine is on-wing. It will be understood, however, that aspects of the disclosure described herein are not so limited and can have general applicability within other lubricant systems. For example, the disclosure can have applicability for a lubricant system in other engines or vehicles, and may be used to provide benefits in industrial, commercial, and residential applications.

Traditional lubricant systems in turbine engines generally include a pump supplying lubricant, such as oil, from a reservoir to various engine components such as gears or bearings. Such pumps can be driven by a rotating portion, or rotor, of the engine core and operate with a volumetric flow rate that increases with pump speed. In such a system, the supplied flow rate to the various engine components can increase in proportion to engine speed, where certain operations (such as an aircraft during take-off) will deliver a high flow rate to the engine components. However, such systems can supply needlessly high flow rates during other operations of the engine, such as during cruise periods where the engine operates at a moderately high, but steady, rate.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor.

Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Portions of a lubricant system 100 are schematically illustrated in FIG. 1 in the form of a vehicle lubrication system arranged throughout the engine 10. The lubricant system 100 includes a lubricant reservoir 102 that can contain a volume of lubricant to circulate through the lubricant system 100. A series of lubricant conduits 103 can interconnect multiple elements of the lubricant system 100 providing for provision or circulation of the lubricant throughout the lubricant system and any engine components coupled thereto.

Optionally, at least one heat exchanger 105 can be included in the lubricant system 200. Non-limiting examples of the heat exchanger 105 can include a fuel/lubricant (fuel-to-lubricant) heat exchanger, an oil/lubricant heat exchanger, or an air cooled oil cooler, or the like. For example, a fuel/lubricant heat exchanger can be used to heat or cool engine fuel with lubricant passing through the heat exchanger. In another example, a lubricant/oil heat exchanger can be used to heat or cool additional lubricants passing within the engine 10, fluidly separate from the lubricant passing along the lubricant system 100. Such a lubricant/oil heat exchanger can also include a servo/lubricant heat exchanger. Optionally, a second heat exchanger (not shown) can be provided along the exterior of the engine core 44, downstream of the outlet guide vane assembly. The second heat exchanger can be an air/lubricant heat exchanger, for example, adapted to convectively cool lubricant in the lubricant system 100 utilizing the airflow passing through the outlet guide vane assembly 80.

It should be understood that the organization of the lubricant system 100 as shown is by way of example only to illustrate an exemplary system within the engine 10 for circulating lubricant for purposes such as lubrication or heat transfer. Any organization for the lubricant system 100 is contemplated, with or without the elements as shown, or including additional elements interconnected by any necessary conduit system.

Figure 2:
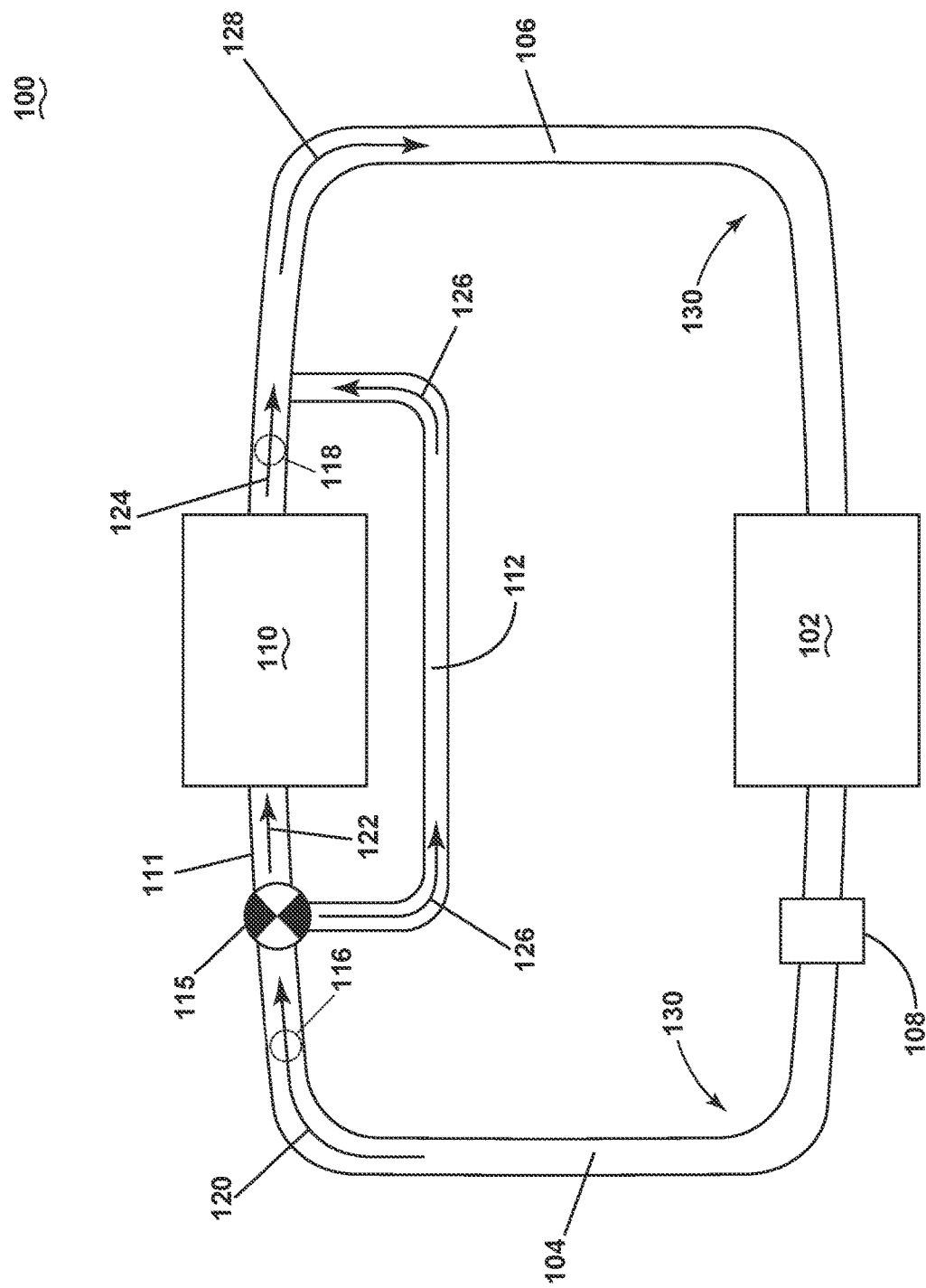
FIG. 2 is a schematic diagram of the lubricant system of FIG. 1 supplying lubricant to an engine component in accordance with various aspects described herein.

Turning to FIG. 2, the lubricant system 100 is schematically illustrated in isolation from the turbine engine 10. The lubricant system 100 includes the lubricant reservoir 102 configured to store a coolant or lubricant, including organic or mineral oils, synthetic oils, or fuel, or mixtures or combinations thereof. A supply line 104 and a scavenge line 106 are fluidly coupled to the reservoir 102 and collectively form a lubricant circuit to which the reservoir 102 and component 110 can be fluidly coupled. The component 110 can be supplied with lubrication by way of a fluid coupling with the supply line 104 and can return the supplied lubricant to the reservoir 102 by fluidly coupling to the scavenge line 106. More specifically, a component supply line 111 can be fluidly coupled between the supply line 104 and the component 110. It is further contemplated that multiple types of lubricant can be provided in other lines not explicitly shown, but nonetheless included in the lubricant system 100.

A pump 108 can be provided in the lubricant system 100 to aid in recirculating lubricant from the reservoir 102 to the component 110 via the supply line 104. For example, the pump 108 can be driven by a rotating component of the turbine engine 10, such as the HP shaft 48 or the LP shaft 50 (FIG. 1).

Lubricant can be recovered from the component 110 by way of the scavenge line 106 and returned to the reservoir 102. In the illustrated example, the pump 108 is illustrated along the supply line 104 downstream of the reservoir 102. The pump 108 can be located in any suitable position within the lubricant system 100, including along the scavenge line 106 upstream of the reservoir 102. In addition, while not shown, multiple pumps can be provided in the lubricant system 100.

A bypass line 112 can be fluidly coupled to the supply line 104 and scavenge line 106 in a manner that bypasses the component 110. A bypass valve 115 is fluidly coupled to the supply line 104, component supply line 111, and bypass line 112. The bypass valve 115 is configured to control a flow of lubricant through at least one of the component supply line 111 or the bypass line 112. The bypass valve 115 can include any suitable valve including, but not limited to, a differential thermal valve, rotary valve, flow control valve, or pressure safety valve.

During operation, a supply flow 120 can move from the reservoir 102, through the supply line 104, and to the bypass valve 115. A component input flow 122 can move from the bypass valve 115 through the component supply line 111 to the component 110. A scavenge flow 124 can move from the component 110 through the scavenge line 106 and back to the reservoir 102. Optionally, a bypass flow 126 can move from the bypass valve 115 through the bypass line 112 and to the scavenge line 106. The bypass flow 126 can mix with the scavenge flow 124 and define a return flow 128 moving toward the lubricant reservoir 102.

In one example where no bypass flow exists, it is contemplated that the supply flow 120 can be the same as the component input flow 122 and that the scavenge flow 124 can be the same as the return flow 128. In another example where the bypass flow 126 has a nonzero flow rate, the supply flow 120 can be divided at the bypass valve 115 into the component input flow 122 and bypass flow 126. It will also be understood that additional components, valves, sensors, or conduit lines can be provided in the lubricant system 100, and that the example shown in FIG. 2 is simplified with a single component 110 for illustrative purposes only.

The lubricant system 100 can further include at least one sensing position at which at least one lubricant parameter can be sensed or detected. The at least one lubricant parameter can include, but is not limited to, a temperature, a pressure, a viscosity, a chemical composition of the lubricant, or the like. In the illustrated example, a first sensing position 116 is located in the supply line 104 upstream of the component 110, and a second sensing position 118 is located in the scavenge line 106 downstream of the component 110.

In one example, the bypass valve 115 can be in the form of a differential thermal valve configured to sense or detect at least one lubricant parameter in the form of a temperature of the lubricant. In such a case, the fluid coupling of the bypass valve 115 to the first and second sensing positions 116, 118 can provide for bypass valve 115 sensing or detecting the lubricant temperature at the sensing positions 116, 18 as lubricant flows to or from the bypass valve 115. The bypass valve 115 can be configured to control the component input flow 122 or the bypass flow 126 based on the sensed or detected temperature.

It is contemplated that the bypass valve 115, supply line 104, and bypass line 112 can at least partially define a closed loop control system for the component 110. As used herein, a "closed loop control system" will refer to a system having mechanical or electronic components that can automatically regulate, adjust, modify, or control a system variable without manual input or other human interaction. Such closed loop control systems can include sensing components to sense or detect parameters related to the desired variable to be controlled, and the sensed or detected parameters can be utilized as feedback in a "closed loop" manner to change the system variable and alter the sensed or detected parameters back toward a target state. In the example of the lubricant system 100, the bypass valve 115 (e.g. mechanical or electrical component) can sense a parameter, such as the lubricant parameter (e.g. temperature), and automatically adjust a system variable, e.g. flow rate to either or both of the bypass line 112 or component 110, without need of additional or manual input. In one example, the bypass valve can be automatically adjustable or self-adjustable such as a thermal differential bypass valve. In another example, the bypass valve can be operated or actuated via a separate controller. It will be understood that a closed loop control system as described herein can incorporate such a self-adjustable bypass valve or a controllable bypass valve.

Figure 3:
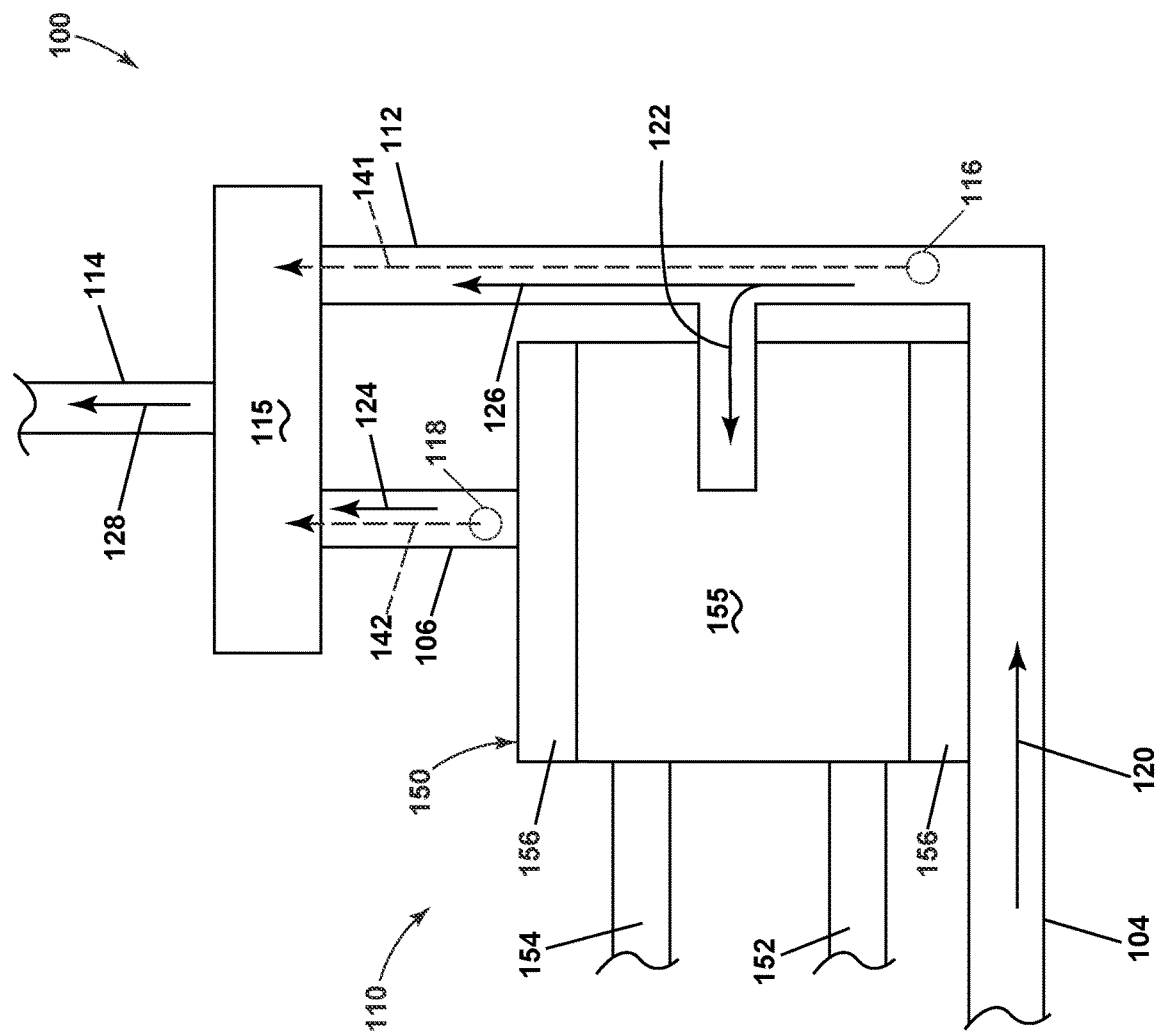
FIG. 3 is a schematic diagram of another lubricant system that can be utilized to supply lubricant to a gearbox in accordance with various aspects described herein.

Turning to FIG. 3, a portion of the lubricant system 100 is illustrated supplying lubricant to a particular component 110 in the form of a gearbox 150 within the turbine engine 10 (FIG. 1). The gearbox 150 can include an input shaft 152, an output shaft 154, and a gear assembly 155. In one example, the gear assembly 155 can be in the form of an epicyclic gear assembly as known in the art having a ring gear, sun gear, and at least one planet gear. An outer housing 156 can at least partially surround the gear assembly 155 and form a structural support for the gears and bearings therein. Either or both of the input and output shafts 152, 154 can be coupled to the turbine engine 10 (FIG. 1). In one non-limiting example, the input and output shafts 152, 154 can be utilized to decouple the LP turbine 36 from the LP compressor 24 and the fan 20, such as for improving rotation efficiency. In another non-limiting example (not shown) where the lubricant system is utilized in a turboprop engine, the input shaft can provide torque from the engine to drive a propeller through the output shaft.

The supply line 104 can be fluidly coupled to the gearbox 150, such as to the gear assembly 155, to supply lubricant to gears or bearings to the gearbox 150 during operation. The scavenge line 106 can be fluidly coupled to the gearbox 150, such as to the gear assembly 155 or outer housing 156, to collect lubricant. The bypass line 112 can be fluidly coupled to the bypass valve 115, supply line 104, and scavenge line 106 as shown. A return line 114 can also be fluidly coupled to the bypass valve 115, such as for directing the return flow 128 to the lubricant reservoir 102 for recirculation. While not shown in FIG. 3 for brevity, the lubricant reservoir 102 or pump 108 (FIG. 2) can also be fluidly coupled to the gearbox 150. In this manner, the supply line 104, bypass line 112, scavenge line 106, and return line 114 can at least partially define a recirculation line 130 for the lubricant system 100.

The supply flow 120 divides at the bypass line into the component input flow 122 and the bypass flow 126. In the example shown, the bypass valve 115 is in the form of a differential thermal valve that is fluidly coupled to the first and second sensing positions 116, 118.

Lubricant flowing proximate the first and second sensing positions 116, 118 provides the respective first and second outputs 141, 142 indicative of the temperature of the lubricant at those sensing positions 116, 118. It will be understood that the supply line 104 is thermally coupled to the bypass line 112 and bypass valve 115 such that the temperature of the fluid in the supply line 104 proximate the first sensing position 116 is approximately the same as fluid in the bypass line 112 adjacent the bypass valve 115. Two values being "approximately the same" as used herein will refer to the two values not differing by more than a predetermined amount, such as by more than 20%, or by more than 5 degrees, in non-limiting examples. In this manner, the bypass valve 115 can sense the lubricant temperature in the supply line 104 and scavenge line 106 via the first and second outputs 141, 142. It can be appreciated that the bypass line 112 can form a sensing line for the valve 115 to sense the lubricant parameter, such as temperature, at the first sensing position 116.

During operation of the engine 10 (FIG. 1), the lubricant temperature can increase within the gearbox 150, such as due to heat generation of the gearbox 150, and throughout the lubricant system 100. In one example, if a lubricant temperature exceeds a predetermined threshold temperature at either sensing position 116, 118, the bypass valve 115 can automatically increase the component input flow 122, e.g. from the supply line 104 to the gearbox 150, by decreasing the bypass flow 126. Such a predetermined threshold temperature can be any suitable operating temperature for the gearbox 150, such as 150° C. in one non-limiting example. Increasing the component input flow 122 can provide for cooling of the gearbox 150, thereby reducing the lubricant temperature sensed in the various lines 104, 106, 112, 114 as lubricant recirculates through the lubricant system 100.

In another example, if a temperature difference between the sensing positions 116, 118 exceeds a predetermined threshold temperature difference, the bypass valve can automatically increase the component input flow 122 by decreasing the bypass flow 126. Such a predetermined threshold temperature difference can be any suitable operating temperature for the gearbox 150, such as 20° C., or differing by more than 30%, in non-limiting examples. In yet another example, if a temperature difference between the sensing positions 116, 118 is below the predetermined threshold temperature difference, the bypass valve can automatically decrease the component input flow 122 or increase the bypass flow 126. In this manner the lubricant system 100 can provide for the gearbox to operate with a constant temperature difference between the supply and scavenge lines 204, 106.

Figure 4:
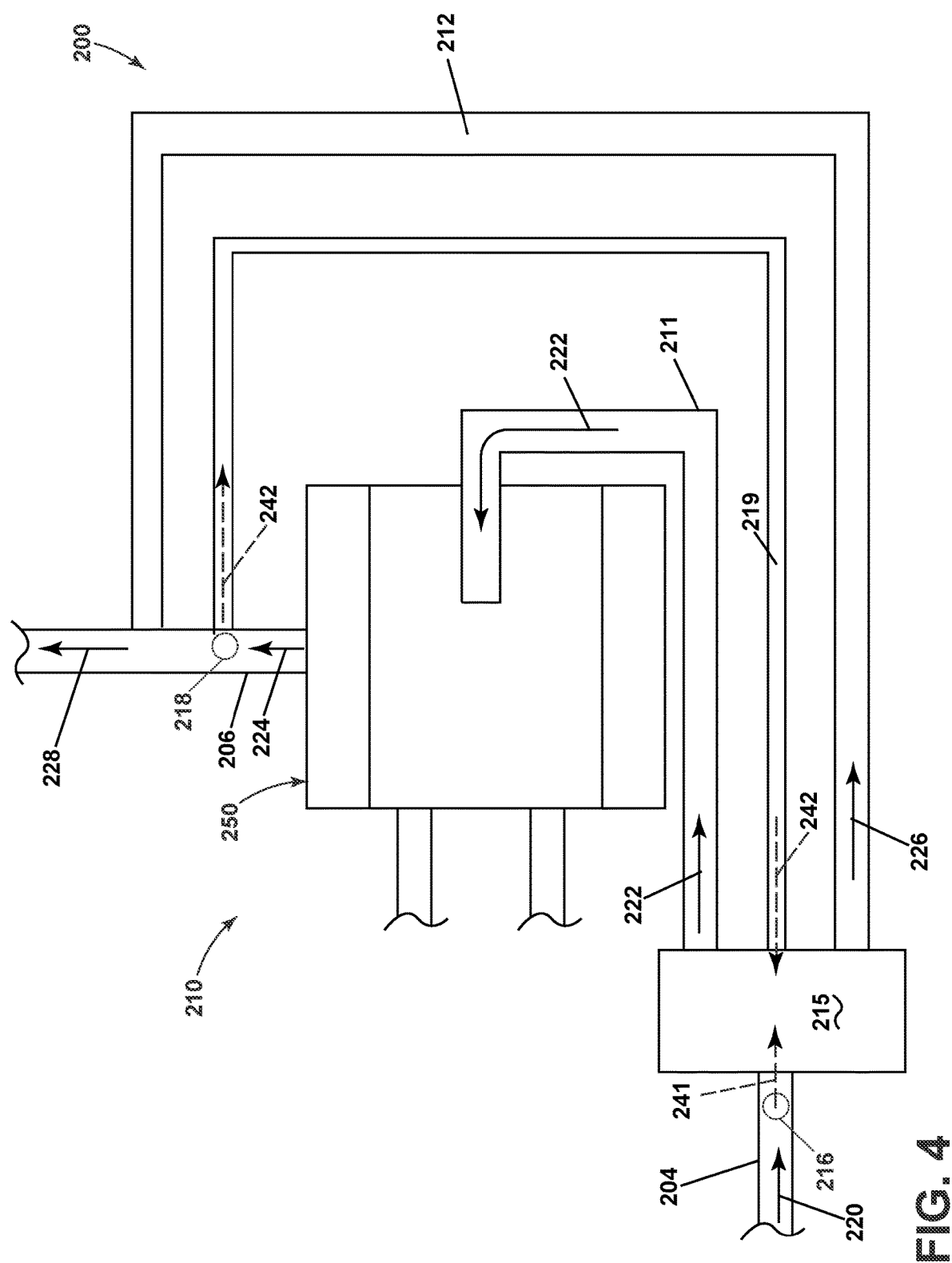
FIG. 4 is a schematic diagram of another lubricant system that can be utilized to supply lubricant to a gearbox in accordance with various aspects described herein.

Turning to FIG. 4, another exemplary lubricant system 200 is illustrated, which is a variation to lubricant system 100. The lubricant system 200, as a variation, is similar to the lubricant system 100; therefore, like parts will be identified with like numerals increased by 100, with it being understood that the description of the like parts of the lubricant system 100 applies to the lubricant system 200, except where noted.

The lubricant system 200 is shown fluidly coupled to a lubricated component 210 in the form of a gearbox 250. A first sensing position 216 is shown in the supply line 204, and a second sensing position 218 is located in the scavenge line 206. A component supply line 211 is fluidly coupled to the supply line 204 and provides a component input flow 222 to the gearbox 250. A bypass valve 215 is fluidly coupled to the supply line 204, component supply line 211, and bypass line 212. A supply flow 220 moves through the supply line 204 toward the bypass valve 215, and the component input flow 222 and bypass flow 226 move from the bypass valve 215 as shown.

One difference between the lubricant systems 200 and 100 is that a dedicated sensing line 219 is provided between, fluidly coupled to, and thermally coupled to, the bypass valve 215 and the second sensing position 218. The sensing line 219 can be in the form of a small fluid conduit filled with lubricant by way of the fluid coupling between the bypass valve 215 and scavenge line 206.

During operation, the supply flow 220 can divide into the component input flow 222 and bypass flow 226 via the bypass valve 215. A scavenge flow 224 can exit the gearbox 250 and join with the bypass flow 226 to form a return flow 228. The fluid flow proximate the first sensing position 216 can provide a first output 241 to the bypass valve 215, and fluid flow proximate the second sensing position 218 can provide a second output 242 to the bypass valve 215 as shown. The first and second outputs 241, 242 can represent a temperature of the lubricant at the respective first and second sensing positions 216, 218. In one example, if a lubricant temperature exceeds a predetermined threshold temperature at either sensing position 216, 218, the bypass valve 215 can automatically increase the component input flow 222, e.g. by decreasing the bypass flow 226. In another example, if a lubricant temperature difference between the sensing positions 216, 218 is above a predetermined threshold temperature difference as described above, the bypass valve 215 can increase the component input flow 222 or decrease the bypass flow 226. In yet another example, if a lubricant temperature difference between the sensing positions 216, 218, is below a predetermined threshold temperature difference as described above, the bypass valve 215 can decrease the component input flow 222 or increase the bypass flow 226.

Figure 5:
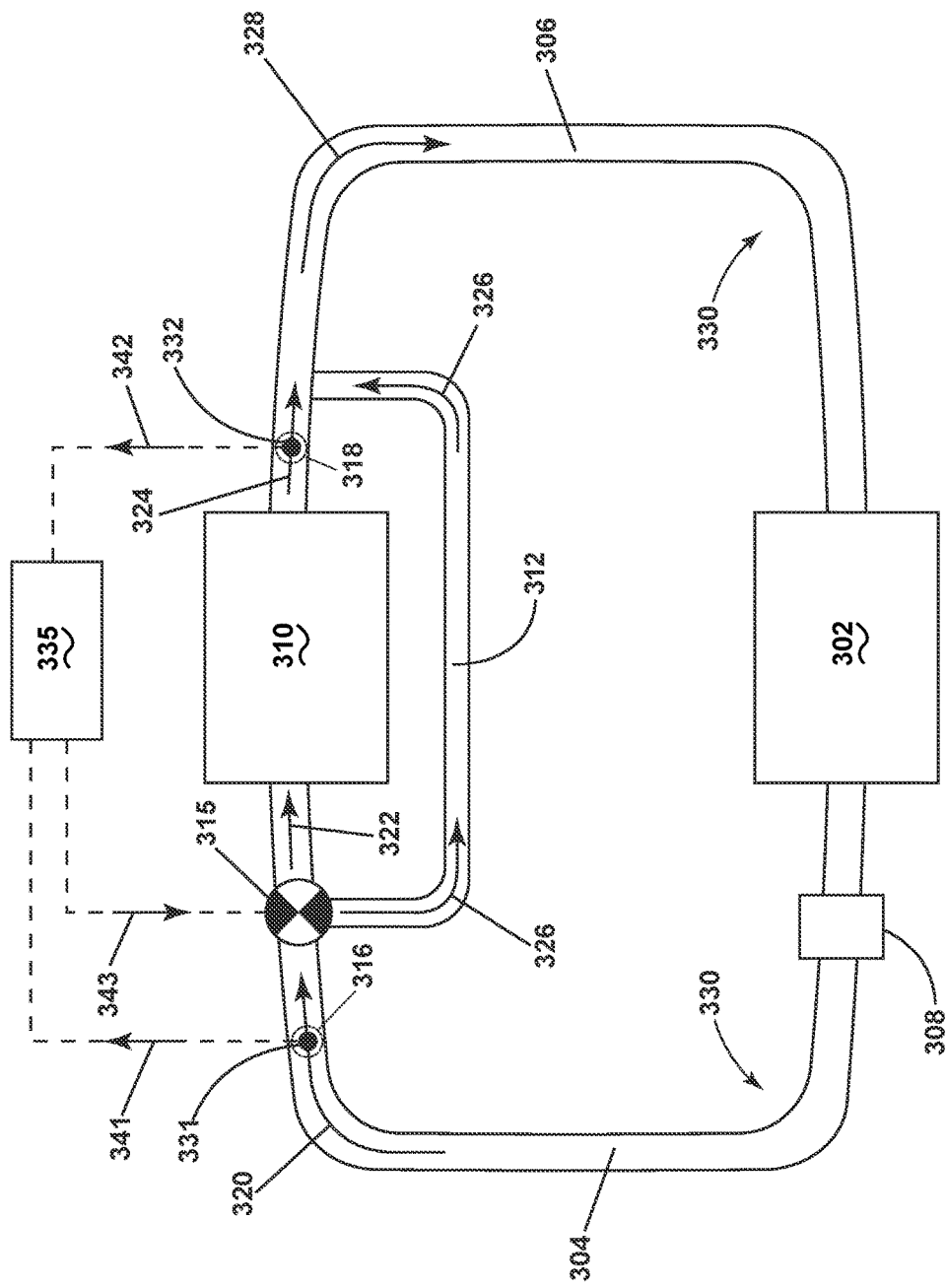
FIG. 5 is a schematic diagram of another lubricant system that can be utilized to supply lubricant to an engine component in accordance with various aspects described herein.

Referring now to FIG. 5, another lubricant system 300, which is a variation of lubricant systems 100 and 200, is shown that can be utilized in the turbine engine 10 (FIG. 1). The lubricant system 300 is similar to the lubricant system 100, 200; therefore, like parts will be identified with like numerals further increased by 100. It will be understood that the description of the like parts of the lubricant system 100, 200 applies to the lubricant system 300, except where noted.

The lubricant system 300 is schematically illustrated in isolation from the turbine engine 10 (FIG. 1) for clarity. The lubricant system 300 includes a lubricant reservoir 302 configured to store a lubricant, such as oil. A supply line 304 and a scavenge line 306 are fluidly coupled to the reservoir 302. A turbine engine component 310 can be supplied with lubrication by way of a fluid coupling to the supply line 304 and scavenge line 306. More specifically, a component supply line 311 can be fluidly coupled between the supply line 304 and the component 310.

A pump 308 can be provided in the lubricant system 300 to aid in recirculating lubricant from the reservoir 302 to the component 310 via the supply line 304. The pump 308 can be utilized to recover lubricant from the component 310 or recirculate the lubricant via the reservoir 302. The pump 308 can be located at any suitable position in the lubricant system for recovering or recirculating lubricant. While not shown, multiple pumps can be included in the lubricant system 300 for separately recovering lubricant from the component 310 and for recirculating lubricant via the reservoir 302.

A bypass line 312 can be fluidly coupled to the supply line 304 and scavenge line 306 in a manner that bypasses around the component 310. A bypass valve 315 is fluidly coupled to the supply line 304, component supply line 311, and bypass line 312 and configured to control a flow of lubricant through the bypass line 312. The bypass valve 315 can include any suitable valve including, but not limited to, a differential thermal valve, rotary valve, flow control valve, or pressure safety valve.

A supply flow 320 can move toward the component 310. The supply flow 320 can divide at the bypass valve 315 into a component input flow 322 and a bypass flow 326 as shown. A scavenge flow 324 can exit the component 310 and combine with the bypass flow 326 to form a return flow 328 as shown. In this manner, the supply line 304, bypass line 312, scavenge line 306, and return line 314 can at least partially define a recirculation line 330 for the lubricant system 300.

The lubricant system 300 can further include at least one sensing position at which at least one lubricant parameter can be sensed or detected. In the example shown, a first sensing position 316 is located in the supply line 304 upstream of the component 310, and a second sensing position 318 is located in the scavenge line 106 downstream of the component 310.

One difference between the lubricant systems 200, 100 and 300 is that the lubricant system 300 includes at least one sensor configured to sense or detect the at least one lubricant parameter. For example, a first sensor 331 can be provided at the first sensing position 316, and a second sensor 332 can be provided at the second sensing position 318. A controller 335 can be communicatively coupled to the first and second sensors 331, 332.

The first sensor 331 can provide a first output 341 indicative of a first lubricant parameter in the supply line 304. The second sensor 332 can provide a second output 342 indicative of a second lubricant parameter in the scavenge line 306. For example, the first and second lubricant parameters can be a temperature of the lubricant at the first and second sensing positions 316, 318, e.g. upstream and downstream of the component 310. The controller 335 can receive the first and second outputs 341, 342 and operably control the bypass valve 315 based on the outputs 341, 342. For example, the controller 335 can transmit a control signal 343 to the bypass valve 315 to operably control the bypass valve 315.

It is contemplated that any or all of the bypass valve 315, supply line 304, bypass line 312, sensing positions 316, 318, sensors 331, 332, and controller 335 can at least partially define a closed loop control system as described above. The controller 335 can sense a parameter, e.g. lubricant parameter, via the sensors 331, 332, and control the bypass valve 315 to adjust a system variable, e.g. supply flow, component supply flow, or bypass flow, to effect a change in the sensed parameter.

Figure 6:
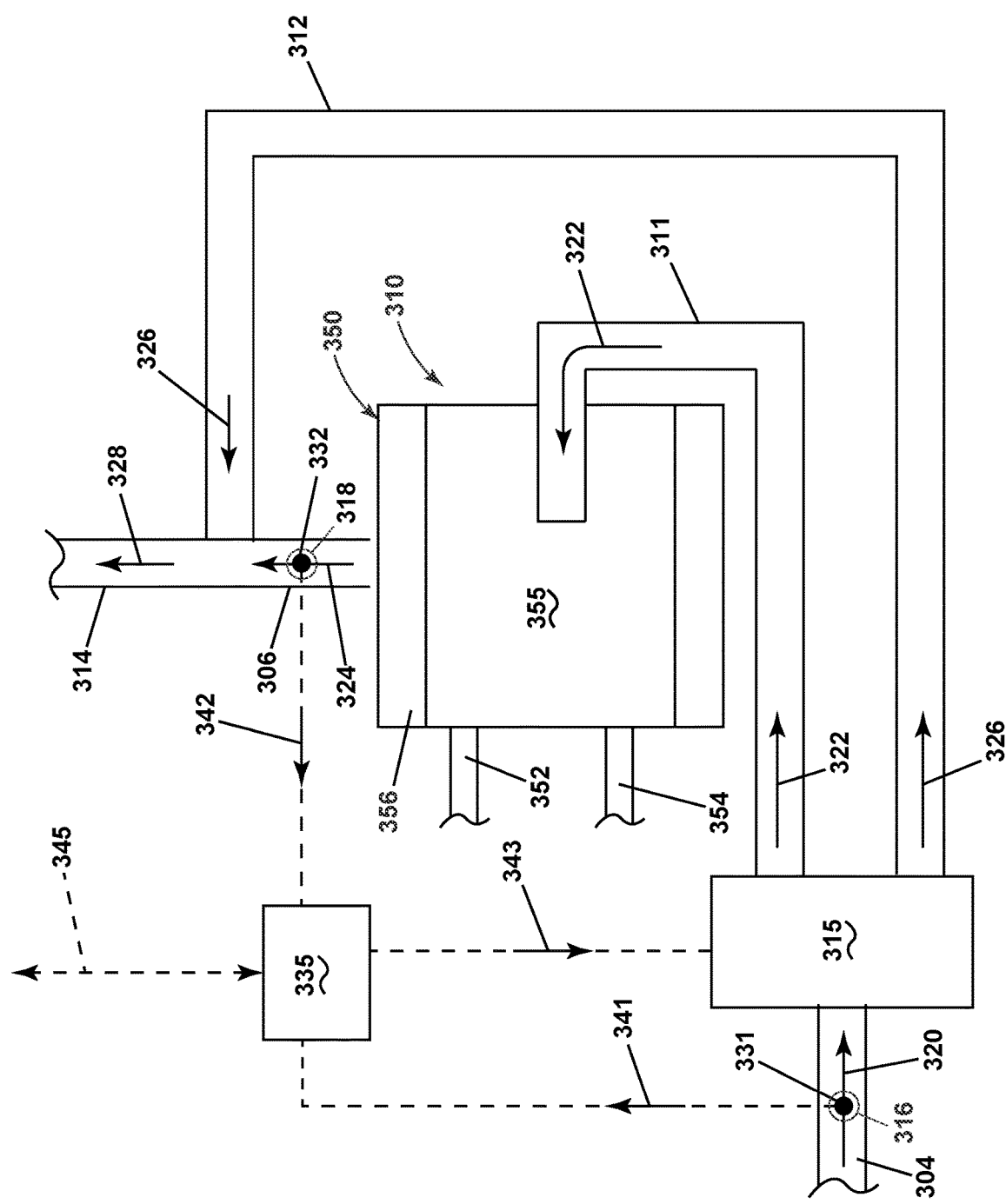
FIG. 6 is a schematic diagram of the lubricant system of FIG. 5 supplying lubricant to a gearbox in accordance with various aspects described herein.

FIG. 6 illustrates one example of the lubricant system 300 supplying lubricant to the component 310 in the form of a gearbox 350 within the turbine engine 10 (FIG. 1). The gearbox 350 can include an input shaft 352, an output shaft 354, and a gear assembly 355. An outer housing 356 can surround or support the gear assembly 355 or shafts 352, 354. In one example, the gear assembly 355 can be in the form of an epicyclic gear assembly as known in the art having a ring gear, sun gear, and at least one planet gear. An outer housing 356 can at least partially surround the gear assembly 355 and form a structural support for the gears and bearings therein.

The supply line 304 can be fluidly coupled to the gearbox 350, such as to the gear assembly 355, to supply lubricant to gears or bearings to the gearbox 350 during operation. The scavenge line 306 can be fluidly coupled to the gearbox 350, such as to the gear assembly 355 or outer housing 356, to collect lubricant for recirculation. The bypass line 312 can be fluidly coupled to the bypass valve 315, supply line 304, and scavenge line 306 as shown. A return line 314 can also be fluidly coupled to the bypass valve 315, such as for directing the return flow 328 to the lubricant reservoir 302 (FIG. 5) for recirculation. The supply flow 320 divides at the bypass valve 315 into the component input flow 322 and the bypass flow 326. The bypass flow 326 combines with the scavenge flow 324 to form the return flow 328.

The controller 335 is illustrated in signal communication with the first and second sensors 331, 332 located at the first and second sensing positions 316, 318. Such signal communication can be in the form of a wired or wireless electrical connection as described above. The controller 335 is also illustrated as being electrically coupled to the bypass valve 315, where the control signal 343 can be transmitted from the controller 335 to the bypass valve 315. In addition, the controller 335 can be communicatively coupled to any other suitable system (not shown), such as in the engine 10 or elsewhere. In one example where the turbine engine 10 is provided on an aircraft, a flight management system, engine control system, or FADEC system can transmit or receive a signal 345 to or from the controller 335. The controller 335 can operate the bypass valve 315 in response to the signal 345, including in combination with the first and second outputs 341, 342. For example, the controller 335 can receive the signal 345 from a PID controller and send an actuation signal to the bypass valve 315 to control or actuate the valve 315. Optionally, the controller 335 can be incorporated directly into a FADEC among other controlling functions thereof, as an alternative to using a separate FADEC and controller 335.

With reference to aspects of the disclosure described in FIGS. 1-6, some exemplary descriptions of the lubricant system in operation will be described below. It will be understood that the following non-limiting descriptions are provided by way of illustration only.

In one example, a lubricant system can supply an engine component on an aircraft having a FADEC. The lubricant system can include a remote controller in wired or wireless communication with a first sensor located at a first sensing position and a second sensor located at a second sensing position. A lubricant parameter in the form of fluid pressure can be sensed at the two sensing positions and transmitted to the remote controller. The remote controller can receive a signal from the FADEC that the engine is being "throttled up" to increase speed. The remote controller can determine, based on the FADEC signal and the sensed lubricant parameters, that additional lubricant is desired to flow to the engine component. Based on the determination, the remote controller can transmit an operation signal to the bypass valve to adjust such that the component supply flow is increased and the bypass flow is decreased.

In another example, a lubricant system can supply an engine component on an unmanned aircraft. The lubricant system can include a controllable thermal bypass valve that can also be capable of automatically adjusting a flow rate without an external control signal, such as that from a controller. Sensors can be located at respective sensing locations throughout the lubricant system, and a controller can be communicatively coupled to the bypass valve and sensors. For example, the controller can monitor a status of the bypass valve as it automatically adjusts a bypass flow or component supply flow, and can also provide an override signal to operate the bypass valve based on output from the sensors.

During a "cruise" period in which the unmanned aircraft is flying at a near-constant speed and altitude, the controller can receive output from the sensors indicating that a temperature difference of the lubricant between two sensing positions is lower than a predetermined target difference, e.g. differing by less than 30° C. The controller can override the bypass valve to decrease the component supply flow, thereby utilizing less lubricant based on the sensed need of the engine component for lubrication.

Figure 7:
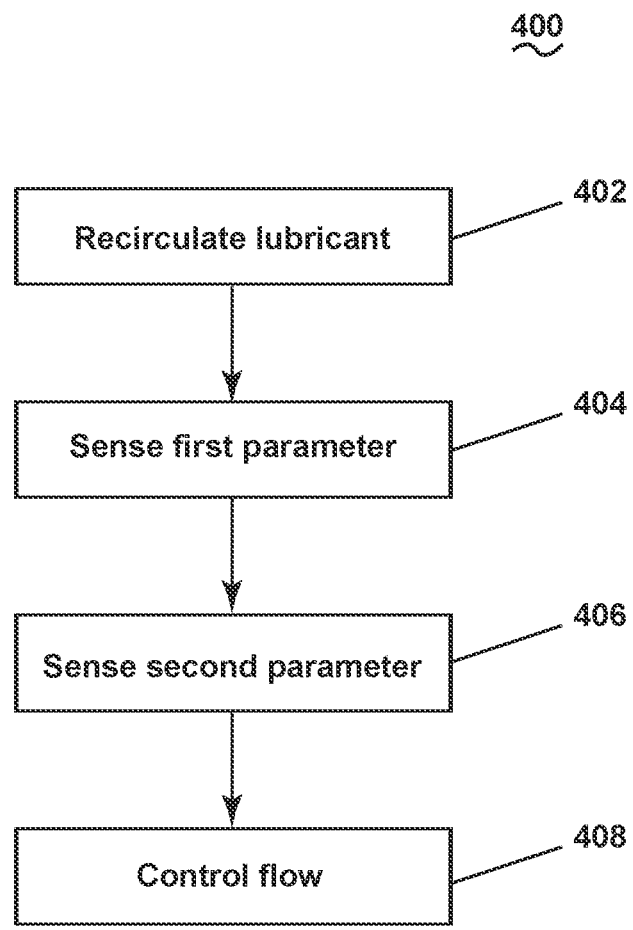
FIG. 7 is a flowchart illustrating a method of supplying lubricant to a component in accordance with various aspects described herein.

Turning to FIG. 7, a method 400 of supplying lubricant to a component, such as the component 110, 210, 310, is illustrated. The method 400 includes, at 402, recirculating lubricant through a recirculation line from a reservoir, through the component, and back to the reservoir. For example, the recirculation line can include any or all of the supply line 104, 204, 304, or scavenge line 106, 206, 306. The reservoir can include the lubricant reservoir 102, 302. At 404, a first parameter of the lubricant can be sensed upstream of the component, and at 406 a second parameter of the lubricant can be sensed downstream of the component. The first and second parameters in one example can be a temperature of the lubricant as described above. The method also includes at 408 controlling a flow rate of lubricant to the component based on the sensed first and second parameters.

In one example, the sensing of lubricant parameters at 404 and 406 can be performed via a thermal differential bypass valve. In such a case, sensing the parameter at 404 and 406 can include directly sensing the lubricant parameter, and such sensing can be automatically performed by the bypass valve as described above. For example, if a temperature difference between the lubricant in the supply line and scavenge line is below a predetermined threshold temperature difference, e.g. 20-30° C., the thermal differential bypass valve can automatically direct at least some lubricant from the supply line to the bypass line, which joins with the scavenge line downstream of the component. In this manner heat generation of the component can be limited via a windage effect, which can enhance the efficiency.

In another example, the sensing at 404 and 406 can be performed by sensors, such as the first and second sensors 331, 332 as described above. In such a case, the bypass valve can be operably controlled by a controller based on first and second outputs from the respective first and second sensors. For example, if a temperature of the lubricant sensed by either sensor exceeds a predetermined threshold temperature, such as 150° C., the controller can operate the bypass valve to increase a component supply flow or decrease a bypass flow as described above. In another example, if the controller determines that a temperature difference between the sensors exceeds a predetermined threshold temperature difference, such as 40-50° C., the controller can operate the bypass valve to increase a component supply flow or decrease a bypass flow as described above.

It is further contemplated that the lubricant system of any of the above-described examples can be utilized with multiple, differing lubricants. For example, the lubricant system can include a first lubricant reservoir storing a first lubricant, such as oil, as well as a second lubricant reservoir storing a second lubricant, such as fuel. A first sensing position can be located on a first line through which the first lubricant flows, and a second sensing position can be located on a second line through which the second lubricant flows. The bypass valve can be operated based on a first lubricant parameter of the first lubricant and a second lubricant parameter of the second lubricant. For example, if a sensed or detected temperature of either the first lubricant or second lubricant exceeds a predetermined threshold, the bypass valve can be operated to provide additional first lubricant or additional second lubricant to the component. Additionally or alternatively, if a sensed or detected difference between the first lubricant parameter of the first lubricant and the second lubricant parameter of the second lubricant is below a predetermined threshold difference, the bypass valve can be operated to increase a flow of either the first or second lubricants through the bypass line.

Aspects of the disclosure provide for a variety of benefits, including that aspects provide for a closed loop control system for an engine component. Such closed loop control can be accomplished via mechanical components, such as the thermal differential bypass valve, or via electronic components such as the sensors and controller, as described above. In one example in the context of an aircraft engine environment, aspects of the disclosure provide for more efficient use of lubricant in the lubricant system. Compared to traditional methods of oil supply that are directly tied to engine speed, the lubricant system described herein can have the technical effect of providing for an oil flow reduction at cruise of 30-60% compared to oil flow needed during take-off. In one example, aspects of the disclosure provide for an improvement in gearbox efficiency, including an improvement of up to 0.5-1% at low power conditions (e.g. cruise) compared to traditional lubricant supply systems. It can be appreciated that such a reduction also provides for reducing of engine fuel consumption, improving engine efficiency and performance and reducing costs during operation.

In addition, the temperature-based closed loop control of engine gearbox performance can have the technical effect of improving efficiency of other engine components across all flight conditions, regardless of ambient conditions and hardware-to-hardware scatter that may be present. Scavenge temperature control can also provide for safer gearbox performance optimization, as the scavenge temperature can be correlated with a temperature of gear teeth or bearings within the gearbox. For example, the lubricant system can provide for operation of the gearbox at a constant temperature differential which can reduce component wear due to undesirable high-temperature operation. Furthermore, such a constant temperature differential can provide for improved engine efficiency and performance across multiple operating conditions, e.g. low-power and high-power conditions.

It should be appreciated that application of the disclosed design is not limited to turbine engines with fan and booster sections, but is applicable to turbojets and turboshaft engines as well. Further still, such disclosures are applicable to other lubricant systems and vehicles.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects, and advantages of the present disclosure may also be embodied in any permutation of aspects of the disclosure including, but not limited to, the following technical solutions as defined in the enumerated aspects:

1. A lubricant system for supplying lubrication to a component in a turbine engine, the lubricant system comprising:
   a lubricant reservoir;
   a supply line fluidly coupling the lubricant reservoir to the component in the turbine engine;
   a scavenge line fluidly coupling the component to the lubricant reservoir;
   a bypass line fluidly coupling the supply line to the scavenge line and bypassing the component;
   a first sensing position providing a first output indicative of a first lubricant parameter in the supply line;
   a second sensing position providing a second output indicative of a second lubricant parameter in the scavenge line; and a bypass valve fluidly coupled to the first sensing position and second sensing position and controlling the flow of lubricant through the bypass line based on the first and second outputs.
2. The lubricant system of any of the disclosed aspects wherein the first and second lubricant parameters comprise a temperature of the lubricant at the respective first and second sensing positions.
3. The lubricant system of any of the disclosed aspects wherein the bypass valve comprises a differential thermal valve receiving the first and second outputs.
4. The lubricant system of any of the disclosed aspects wherein the first and second outputs are provided from lubricant flowing proximate the respective first and second sensing positions.
5. The lubricant system of any of the disclosed aspects further comprising a controller receiving the first and second outputs and operably controlling the bypass valve based on the first and second outputs.
6. The lubricant system of any of the disclosed aspects further comprising first and second sensors communicatively coupled to the controller, with the first sensor located at the first sensing position and the second sensor located at the second sensing position.
7. The lubricant system of any of the disclosed aspects wherein the first and second sensor are configured to transmit the respective first and second outputs to the controller.
8. The lubricant system of any of the disclosed aspects wherein at least one of the first sensor or the second sensor comprises a thermocouple.
9. The lubricant system of any of the disclosed aspects wherein the bypass valve is configured to decrease lubricant flow through the bypass line when at least one of the first or second lubricant parameters exceeds a predetermined threshold temperature.
10. The lubricant system of any of the disclosed aspects wherein the bypass valve is configured to increase lubricant flow through the bypass line when a difference between the first and second lubricant parameters is below a predetermined threshold temperature difference.
11. The lubricant system of any of the disclosed aspects wherein the bypass valve is configured to decrease lubricant flow through the bypass line when a difference between the first and second lubricant parameters exceeds the predetermined threshold temperature difference.
12. The lubricant system of any of the disclosed aspects wherein the supply line, bypass line, bypass valve, and sensor at least partially define a closed loop control system for the component.
13. The lubricant system of any of the disclosed aspects wherein the controller further comprises a remote controller in signal communication with the first sensor and the second sensor.
14. The lubricant system of any of the disclosed aspects wherein the remote controller is configured to transmit an operation signal to the bypass valve based on an engine throttle condition.
15. The lubricant system of any of the disclosed aspects wherein the bypass valve further comprises an independently-controllable thermal bypass valve and configured to adjust a flow rate through the bypass valve.
16. The lubricant system of any of the disclosed aspects wherein the controller is further configured to override the bypass valve based on an engine condition.
17. The lubricant system of any of the disclosed aspects further comprising multiple lubricant reservoirs each storing a corresponding lubricant.
18. The lubricant system of any of the disclosed aspects wherein a first lubricant reservoir stores a first lubricant and a second lubricant stores a second lubricant different from the first lubricant.
19. The lubricant system of any of the disclosed aspects wherein the first lubricant parameter corresponds to the first lubricant and the second lubricant parameter corresponds to the second lubricant.
20. The lubricant system of any of the disclosed aspects wherein the supply line is configured to supply at least one of the first lubricant and the second lubricant to the component.
21. The lubricant system of any of the disclosed aspects further comprising a first line carrying the first lubricant and a second line carrying the second lubricant.
22. The lubricant system of any of the disclosed aspects wherein the first sensing position is located in the first line and the second sensing position is located in the second line.
23. A turbine engine, comprising:
   a compressor, combustor, and turbine in axial flow arrangement;
   a shaft operably coupled to at least one of the compressor, combustor, or turbine;
   a lubricated component operably coupled to at least one of the compressor, combustor, turbine, or shaft; and
   a lubricant system fluidly coupled to the lubricated component and comprising:
      a lubricant reservoir;
      a supply line fluidly coupling the lubricant reservoir to the lubricated component;
      a scavenge line fluidly coupling the lubricate component to the lubricant reservoir;

a bypass line fluidly coupling the supply line to the scavenge line and bypassing the lubricated component;

a first sensing position providing a first output indicative of a temperature of the lubricant in the supply line;

a second sensing position providing a second output indicative of a temperature of the lubricant in the scavenge line; and a bypass valve fluidly coupled to the first sensing position and second sensing position and controlling the flow of lubricant through the bypass line based on the first and second outputs.

24. The turbine engine of any of the disclosed aspects wherein the bypass valve comprises a differential thermal valve receiving the first and second outputs from lubricant flowing proximate the respective first and second sensing positions.

25. The turbine engine of any of the disclosed aspects further comprising a controller receiving the first and second outputs and operably controlling the bypass valve based on the first and second outputs.

26. The turbine engine of any of the disclosed aspects wherein the lubricated component comprises a gearbox having at least an epicyclic gear assembly, an outer housing surrounding the epicyclic gear assembly, an input shaft, and an output shaft.

27. The turbine engine of any of the disclosed aspects wherein the bypass valve is configured to decrease lubricant flow from the supply line to the bypass line when at least one of the first or second lubricant parameters exceeds a predetermined threshold temperature.

28. The turbine engine of any of the disclosed aspects wherein the bypass valve is configured to increase lubricant flow from the supply line to the bypass line when a difference between the first and second lubricant parameters is below a predetermined threshold temperature difference.

29. A method of supplying lubricant to a component within a turbine engine, the method comprising:
recirculating lubricant through a recirculation line from a reservoir, through the component, and back to the reservoir;
sensing a first parameter of the lubricant upstream of the component;
sensing a second parameter of the lubricant downstream of the component; and
controlling a flow rate of lubricant to the component based on the sensed first and second parameters.

30. The method of any of the disclosed aspects wherein the first and second lubricant parameters comprise a temperature of the lubricant.

31. The method of any of the disclosed aspects wherein the sensing a first parameter further comprises directly sensing the temperature of the lubricant via a bypass valve fluidly and thermally coupled to the lubricant upstream of the component.

32. The method of any of the disclosed aspects wherein the sensing a first parameter further comprises sensing the temperature of the lubricant via a sensor fluidly coupled to the lubricant upstream of the component and communicatively coupled to a controller.

33. The method of any of the disclosed aspects wherein the controlling further comprises controlling a bypass valve via the controller.

34. The method of any of the disclosed aspects wherein the controlling further comprises increasing the flow rate of lubricant to the component when at least one of the first or second lubricant parameters exceeds a predetermined threshold temperature.

35. The method of any of the disclosed aspects wherein the controlling further comprises bypassing at least some of the lubricant in the recirculation line around the component when a difference between the first and second lubricant parameters is below a predetermined threshold temperature difference.

36. The method of any of the disclosed aspects wherein the recirculating further comprises recirculating a first lubricant through a first line and a recirculating a second lubricant through a second line.

37. The method of any of the disclosed aspects wherein the first sensing position is located in the first line and the second sensing position is located in the second line.

38. The method of any of the disclosed aspects wherein the sensing a first lubricant parameter further comprises transmitting a signal from the first sensor to a remote controller.

39. The method of any of the disclosed aspects wherein the sensing a second lubricant parameter further comprises transmitting a signal from the second sensor to a remote controller.

40. The method of any of the disclosed aspects further comprising transmitting an operation signal from a controller to the bypass valve based on an engine throttle condition.

41. The method of any of the disclosed aspects wherein the bypass valve further comprises an independently-controllable thermal bypass valve and configured to adjust a flow rate through the bypass valve.

42. The method of any of the disclosed aspects further comprising overriding the bypass valve via a controller based on an engine condition.

What is claimed is:

1. A method of supplying lubricant to a component within a turbine engine, the method comprising:
recirculating a lubricant through a recirculation line from a reservoir, through the component, and back to the reservoir;
sensing a first parameter of the lubricant upstream of the component;
sensing a second parameter of the lubricant downstream of the component; and
controlling a flow rate of the lubricant to the component based on the sensed first and second parameters, wherein controlling the flow rate comprises:
controlling a first bypass valve to decrease a lubricant flow through the first bypass valve when at least one of the first parameter or the second parameter exceeds a predetermined threshold temperature; or
controlling the first bypass valve to increase a lubricant flow through the first bypass valve when a difference between the first parameter and the second parameter is below a predetermined threshold temperature difference.

2. The method of claim 1, wherein the first parameter and the second parameter comprise a temperature of the lubricant.

3. The method of claim 2, wherein the sensing the first parameter further comprises directly sensing the temperature of the lubricant via the first bypass valve fluidly and thermally coupled to the lubricant upstream of the component.

4. The method of claim 2, wherein the sensing the first parameter further comprises sensing the temperature of the lubricant via a sensor fluidly coupled to the lubricant upstream of the component and communicatively coupled to a controller.

5. The method of claim 1, wherein the controlling further comprises controlling the first bypass valve via a controller.

6. The method of claim 1, wherein the controlling further comprises increasing the flow rate of the lubricant to the component when at least one of the first parameter or the second parameter exceeds a predetermined threshold temperature.

7. The method of claim 1, wherein the controlling further comprises bypassing at least some of the lubricant in the recirculation line around the component when a difference between the first parameter and the second parameter is below a predetermined threshold temperature difference.

8. The method of claim 1, wherein the recirculating further comprises recirculating a first lubricant through a first line and recirculating a second lubricant through a second line.

9. The method of claim 8, wherein the sensing the first parameter occurs in the first line and the sensing the second parameter occurs in the second line.

10. The method of claim 1, wherein the sensing the first parameter further comprises transmitting a signal from a first sensor to a remote controller.

11. The method of claim 1, wherein the sensing the second parameter further comprises transmitting a signal from a second sensor to a remote controller.

12. The method of claim 1, further comprising transmitting an operation signal from a controller to the first bypass valve based on an engine throttle condition.

13. The method of claim 12, wherein the first bypass valve further comprises an independently-controllable thermal bypass valve configured to adjust the flow rate of the lubricant through the first bypass valve.

14. The method of claim 12, further comprising overriding the first bypass valve via the controller based on an engine condition.

15. The method of claim 1, wherein the recirculation line includes a supply line and a scavenge line in fluid communication with the component and the reservoir, the method further comprising sensing the first parameter in the supply line and sensing the second parameter in the scavenge line.

16. The method of claim 15, wherein the recirculation line further comprises a bypass line, and wherein controlling the flow rate of the lubricant comprises controlling the first bypass valve fluidly coupled to the supply line and the bypass line downstream of the sensing of the first parameter and upstream of the component.

17. The method of claim 1, wherein controlling the flow rate of the lubricant occurs in a closed loop control system without manual input or human interaction.

18. The method of claim 1, further comprising pumping the lubricant through the recirculation line.

19. A method of supplying lubricant to a component within a turbine engine, the method comprising:
 recirculating a lubricant through a recirculation line from a reservoir, through the component, and back to the reservoir, the recirculation line including a supply line, a bypass line, and a scavenge line in fluid communication with the component and the reservoir;
 sensing a first parameter of the lubricant upstream of the component;
 sensing a second parameter of the lubricant downstream of the component;
 controlling a flow rate of the lubricant to the component based on the sensed first and second parameters; and
 sensing the first parameter in the supply line and sensing the second parameter in the scavenge line,
 wherein controlling the flow rate of the lubricant comprises controlling a bypass valve fluidly coupled to the supply line and the bypass line downstream of the sensing of the first parameter and upstream of the component.

\* \* \* \* \*